(12) United States Patent
Dawson et al.

(10) Patent No.: US 8,055,104 B2
(45) Date of Patent: Nov. 8, 2011

(54) PROCESS PERFORMANCE EVALUATION FOR ENTERPRISE DATA SYSTEMS

(75) Inventors: John W. Dawson, Scottsville, NY (US); E. Todd Johnsson, Fairport, NY (US); K. Bradley Paxton, Webster, NY (US)

(73) Assignees: ADI, LLC, Rochester, NY (US); ExactData, LLC, Rochester, NY (US)

( * ) Notice: Subject to any disclaimer, the term of this patent is extended or adjusted under 35 U.S.C. 154(b) by 844 days.

(21) Appl. No.: 12/040,894

(22) Filed: Mar. 2, 2008

(65) Prior Publication Data

US 2008/0219557 A1   Sep. 11, 2008

Related U.S. Application Data

(60) Provisional application No. 60/892,654, filed on Mar. 2, 2007.

(51) Int. Cl.
*G06K 9/20* (2006.01)
*G06K 9/00* (2006.01)

(52) U.S. Cl. .................. 382/321; 382/112; 382/181

(58) Field of Classification Search .......... 382/101, 382/112, 181–231, 321–324
See application file for complete search history.

(56) References Cited

U.S. PATENT DOCUMENTS

| | | | |
|---|---|---|---|
| 3,988,715 A * | 10/1976 | Mullan et al. | 382/228 |
| 4,876,735 A * | 10/1989 | Martin et al. | 382/310 |
| 4,941,189 A | 7/1990 | Britt | |
| 4,985,863 A * | 1/1991 | Fujisawa et al. | 382/229 |
| 5,214,718 A | 5/1993 | Khosla | |
| 5,319,721 A * | 6/1994 | Chefalas et al. | 382/160 |
| 5,448,375 A | 9/1995 | Cooper et al. | |
| 5,694,494 A | 12/1997 | Hart et al. | |
| 5,854,957 A | 12/1998 | Morikawa | |
| 5,933,531 A | 8/1999 | Lorie | |
| 6,028,970 A * | 2/2000 | DiPiazza et al. | 382/309 |
| 6,154,579 A * | 11/2000 | Goldberg | 382/310 |
| 6,426,806 B2 | 7/2002 | Melen | |
| 6,654,495 B1 | 11/2003 | Katoh et al. | |
| 6,658,166 B1 | 12/2003 | Zlotnick et al. | |
| 6,661,919 B2 | 12/2003 | Nicholson et al. | |
| 2003/0021477 A1* | 1/2003 | Sommer et al. | 382/181 |
| 2006/0045344 A1 | 3/2006 | Paxton et al. | |

OTHER PUBLICATIONS

Dr. K. Bradley Paxton, Issues in Handprint OCR Data Quality Assessment, Symposium, Apr. 12, 1999, 14 pages, Association for Information and Image Management International, Silver Spring, Maryland.

Nagy et al., Optical Character Recognition: An Ilustrated Guide to the Frontier, SPIE, Jan. 2000, vol. 3967, 58-69.

Amin et al, A document skew detection method using the Hough Trnasform, Pattern Analysis and Applications, Springer Verlag, UK 2000, vol. 3, No. 3, 243-53.

(Continued)

*Primary Examiner* — Wesley Tucker
(74) *Attorney, Agent, or Firm* — Stephen B. Salai, Esq.; Thomas B. Ryan, Patent Agent; Harter Secrest & Emery LLP

(57) ABSTRACT

A method using integrated software and algorithms for measuring, modeling, benchmarking and validating any Enterprise Content management system, forms processing data capture system or data entry system, including, at the user's option, ingest of special engineered test materials such as a Digital Test Deck®, applying data quality scoring algorithms, use of cost models, validation of downstream business processes, and implementing statistical process control.

20 Claims, 3 Drawing Sheets

OTHER PUBLICATIONS

White et al., Image thresholding for optical character recognition and other applications requiring character image extraction, IBM J. Res Develop, Jul. 1983, Vo. 27, No. 4, 400-411.

Dougherty, Edward R., Electronic Imaging Technology, SPIE, Bellingham, Washington, 1999, p. 168.

Riaz, et al., Automating Creation of Digital Test Materials, filed Mar. 2, 2008; U.S. Appl. No. 12/040,896.

Dawson, et al., Method for Statistical Process Control for Data Entry Systems, filed Mar. 2, 2008; U.S. Appl. No. 12/040,895.

* cited by examiner

PROCESS PERFORMANCE EVALUATION FOR ENTERPRISE DATA SYSTEMS

CROSS-REFERENCE TO RELATED APPLICATIONS

This application claims the benefit of U.S. Provisional Application No. 60/892,654, filed Mar. 2, 2007, which application is hereby incorporated by reference.

TECHNICAL FIELD

The invention relates to Enterprise Content Management (ECM) systems and other forms (including checks) processing, particularly for data capture systems, including such activities as manual data entry from image or paper, recognition technologies (OCR, ICR, OMR, etc) that automatically capture data from image, data quality evaluations, and downstream business process performance quality evaluations.

BACKGROUND OF THE INVENTION

System performance in forms processing is typically measured through "inside out" or "white box" test scripting or costly 100% inspection scenarios. System level testing from ingest to population of the content management system is generally not performed, nor is statistical process control employed. This is primarily due to the lack of suitable test materials having a perfectly known result or "truth" with which to compare system performance results, particularly in sufficient quantities to allow statistically valid conclusions.

We have solved the above problems with this invention, which makes possible "outside in" or "black box" testing and cost-effective sampling for process quality assurance. This enables system level testing of all (or portions of) a forms data capture system and provides valid data for statistical process control. A preferred element of this invention is the incorporation of special engineered test materials such as a Digital Test Deck®, available from ADI, LLC of Rochester, N.Y., which simulates a collection of real forms filled out by respondents, but for which the "truth" is already known, thus rendering unnecessary the laborious and expensive "truthing" of large volumes of actual production data. However, the use of production image snippets for which the correct answers have been determined (i.e., they have been "truthed") is also possible in the scope of this invention, if desired.

The invention is preferably practiced by incorporation of a Digital Test Deck® such as described in U.S. patent application Ser. No. 10/933,002 for HANDPRINT RECOGNITION TEST DECK, published on Mar. 2, 2006 under the publication number US 2006/0045344 A1 and hereby incorporated by reference.

SUMMARY OF THE INVENTION

Our invention enables real-time measurement and modeling of system characteristics as part of the workflow of a current Enterprise Content Management (ECM) system or any other forms processing data capture system. With the ingest of special engineered test materials, such as a Digital Test Deck®, and other system operating parameters, flagged test information will become part of the content repository, date and time stamped with other typical content metadata. While some of the examples specifically reference the Digital Test Deck®, other engineered test materials can be used.

With the integration of our software into the Enterprise Service Bus or other workflow manager, one can conveniently measure system performance at any point in time. One will also be able to calculate a cost per form based on measured data, (such as the operation point of the OCR engine) as well as reduce the costs associated with traditional inspection processes through the deployment of statistical process control. System level testing can be deployed to measure and validate any changes or improvements made to the forms processing or data entry system.

A primary aspect of our invention is to enable cost-effective, statistically valid, real-time measurement and modeling of system characteristics as an integrated part of the workflow of a current Enterprise Content Management (ECM) system or any other forms processing data capture system.

Another aspect of our invention is that with the ingest of special engineered test materials, such as a Digital Test Deck®, for which the truth is perfectly known, along with other system operating parameters, flagged test information will become part of the content repository, date and time stamped with other typical content metadata. This test information, consisting of the data capture system's inferences about the true contents of the forms being "read", may then be compared to the perfectly known truth to score the accuracy of the data capture system's inferences. While some of the examples specifically reference the Digital Test Deck®, any specially created test materials could be used, if they are sufficiently well "truthed" and of sufficient quantity to allow statistically valid testing.

Another aspect is that with the integration of our invention into the Enterprise Service Bus or other workflow manager, one can conveniently and cost-effectively measure data capture system performance at any point in time.

Another aspect of our invention is to be able to calculate a processing cost per form based on measured data, (such as the operation point of the OCR engine).

A further aspect is to deploy system level testing to measure and validate any changes or improvements made to the forms processing or data entry system.

An additional aspect of our invention is to allow evaluation of the outputs of just the machine interpreting, or the outputs of human interpreting, or both, in addition the final data capture system outputs.

Another aspect is to allow comparison of data capture system performance over time and from place to place.

Another aspect is to make possible the comparison of two different data capture systems, as might be desired in a proposal and bidding process. This would a fair comparison, as both systems would be inferring the contents of the same data sets.

In addition to scoring data capture accuracy, another aspect of this invention is to enable evaluating data mining systems by designing the test materials to evaluate the internal logic of the systems, such as, testing to see if a document with certain properties is "discovered" by the process.

BRIEF DESCRIPTION OF THE DRAWING FIGURES

FIG. 1 shows the basic technical process flow of module for Automatic Integration and Management of Enterprise Data Quality, based, for example, on a service module AIMED@Q™ (a trademark of ADI, LLC of Rochester, N.Y.) for integrated with an existing, or Legacy forms processing data capture system.

FIG. 2 conceptually depicts AIMED@Q™ APIs working through a Negotiator to interface with a Legacy system.

DETAILED DESCRIPTION OF THE INVENTION

Figure 1:
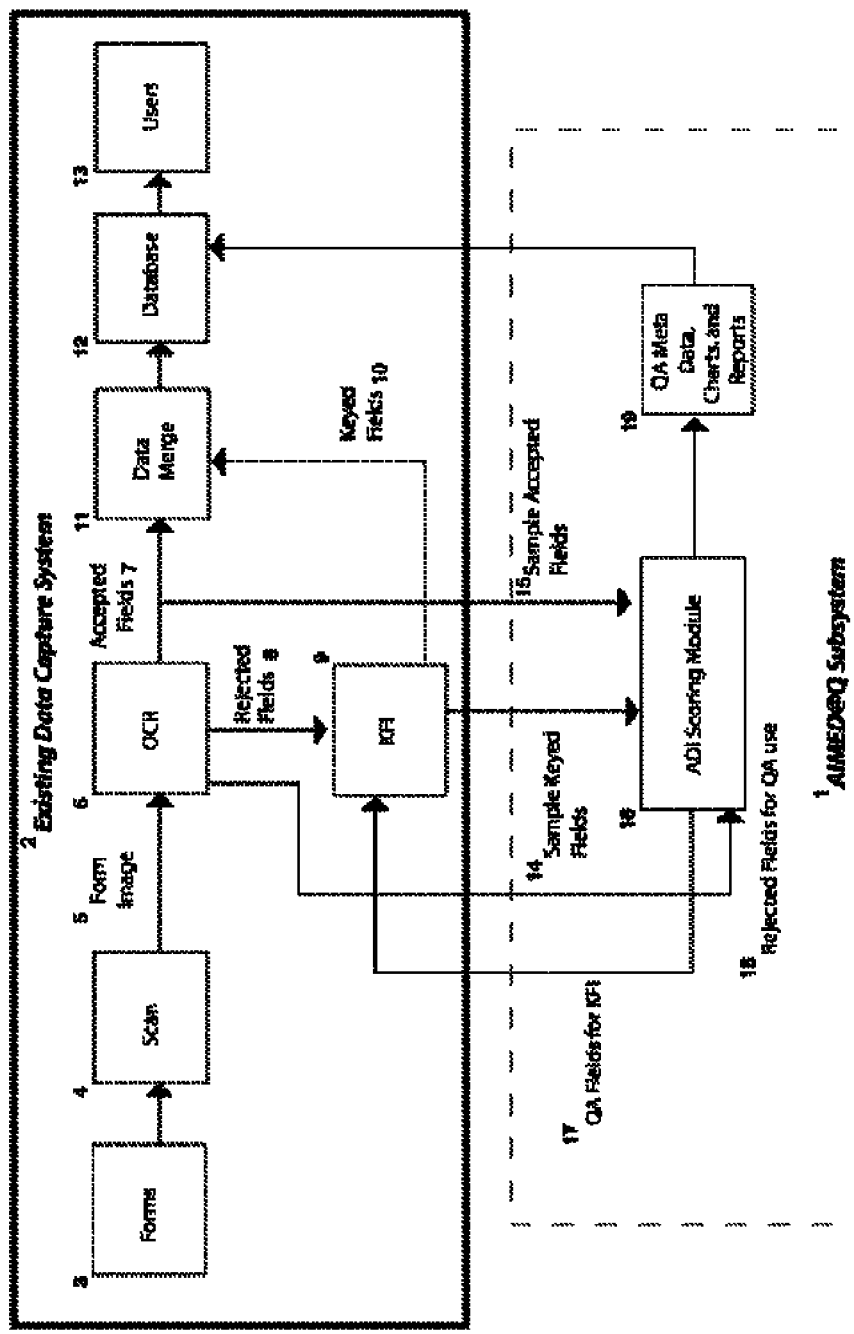

As shown in FIG. 1, integration of the AIMED@Q™ module 1 seamlessly into an existing data capture system 2 will allow users to routinely and automatically verify and track system output data quality. This may be accomplished in several ways, the most basic of which is to use a Digital Test Deck® as input forms 3 to the existing data capture system 2. This test deck of forms, by design, having perfectly known "truth", is the most cost-effective way to measure the performance of a data capture system. The forms first pass through a scanning step 4, and the electronic images of the forms 5 are sent to the OCR subsystem 6. (Alternatively, an electronic image deck could be sent directly to OCR if only software tests are desired). The OCR engine 6 (or ICR, if you prefer), as is well-known by practitioners of the data processing art, then examines the form image and creates an estimate of what is written in the field in question, along with a confidence value. If this confidence value is equal to or greater than the confidence threshold set by the data capture system administrator, then that field is accepted 7 and is sent on to reside in a data merge server 11. Humans typically never see these accepted fields, and their corresponding computer data is sent on to the system database 12 where users 13 may access the data for their downstream business processes.

If a field does not have a confidence value greater than the confidence threshold, then it is rejected 8 and sent to human Keyers who perform Key From Image (KFI) 9 to capture the data from that field. The resultant keyed fields 10 are then sent to data merge 11 to be combined with the accepted fields 7 and stored in the database 12. The combination of the accepted fields 7 and the keyed fields 10 are the total data captured by the existing data capture system 2. This total data contains two sources of error: one is the error made by the OCR (or ICR) subsystem, and the other is the error produced by the human Keyers. In order to measure these errors, the OCR accepted fields are sampled 15 and so are the keyed fields 14 and sent to the AIMED@Q™ ADI Scoring Module 16 for analysis. In the case of using a Digital Test Deck® as input forms, one may choose to sample everything in the deck. (In the case of scoring production data, it is typical to use a sample size that is much smaller than the total production data population, but still statistically valid). By analyzing and counting the errors coming from OCR and KFI, and by counting the number of fields that are accepted relative to the number of fields processed, one can also estimate the total error in the merged data 11 as was taught in our referenced U.S. patent application Ser. No. 10/933,002 for a Handprint Recognition Test Deck.

The AIMED@Q™ Subsystem may also be used to score production data, but unlike like the above example of using a Digital Test Deck®, where the truth is perfectly known, the "truth" of the sampled production data set must first be determined, that is, one must determine the correct answers to the fields that are sampled for analysis. This is a laborious and time-consuming process, usually involving double keying and verifying to get at the correct answers for the sampled fields. Fields selected to be keyed for QA purposes 17 may then be sent to KFI for keying, whether they originate from OCR accepted fields 7 or OCR rejected fields 8. So if a Keyer, say K1, keys from the image snippet of a field selected for QA sampling from the OCR accepted fields 7, and the resultant ASCII data agrees with the result from OCR, than the OCR field is deemed correct. If the result from K1 does not agree with the OCR result, then we have an inconclusive situation regarding the correct answer, and then another Keyer, say K2, is asked to key the same snippet, and if the results from K2 agree with the OCR, then the OCR is deemed correct. If K2 agrees with K1 and not the OCR, then the OCR result is incorrect, and so on. Although such double keying has been practiced in the data capture art prior to this invention, the use of the AIMED@Q™ subsystem 1 integrated with an existing data capture system 2 makes it very easy and cost-effective to implement this approach to measure the quality of production data.

If a sampled keyed field from KFI 14 is selected for QA, keyed originally say by Keyer K1, then another Keyer K2 is independently asked to key the same field image snippet, and if those two resultant ASCII fields agree, then K1 is deemed correct. If K1 and K2 disagree, then we have an inconclusive situation regarding the correct answer, and a third Keyer, say K3, may be employed to attempt to determine the correct answer. If all three Keyers disagree, then this field is usually called "ambiguous", and removed from the scoring process. Another advantage of using AIMED@Q™ 1 integrated with the existing data capture system 2 is the convenient access to OCR rejected fields to assist in QA. By using the data from the OCR's rejected fields 18, one can obtain some additional efficiency in determining the truth of production data by realizing that a substantial amount (often as much as half) of the OCR rejected fields is actually correct, even though rejected. By first comparing the first Keyer K1 result with the OCR rejected field, a match would indicate, with no additional labor, that K1 was correct. In the case where they do not match, then the above procedure may be used as described.

If the amount of production data to be scored is sufficient, the ADI Scoring module 16 may be enhanced by the addition of another OCR engine to determine a provisional data file to use in determining the truth of the data set being scored. In this application, the extra OCR engine is used in much the same way as K1 above, except it is much faster and costs less. The field-level results from the extra OCR engine may be compared with the data from the existing data capture system 2, and if these two ASCII data fields agree, one can declare the existing data capture system to be correct for that field, etc. Human Keyers are brought in only in the case of a disagreement, in which case they can determine which of the two fields are correct, or if neither is correct, key the correct entry. We call this approach "Production Data Quality" (PDQ™, a product available from ADI, LLC of Rochester, N.Y.) and because it uses automation to help get at the truth of a data file, it is a very cost-effective way to assess production data quality.

In many data capture systems, it is common to associate a group of forms in is what is called a "batch", say, of 300 paper forms of a given size. If it is desired to analyze production data in the existing data capture system 2 at the batch level for purposes of performing quality assurance on each batch, then the ADI Scoring Module 16 may be enhanced to perform that function as well, since all the necessary data interfaces and architectures are present. The additional data that must be used is to keep track of batches in production, and to apply a sampling plan to determine if a given batch is acceptable. There are many ways to devise such sampling plans that are well known in the statistical art, but to apply them they usually come down to specifying a batch sample size and a maximum number of errors in the sample that would allow batch acceptance.

Operation on Desktop or in a Client Server Environment

The software may be run in a standalone mode as part of a desktop or distributed client service network as a shared application.

Operation Integrated into Current Workflows and Content Management Systems

Figure 2:
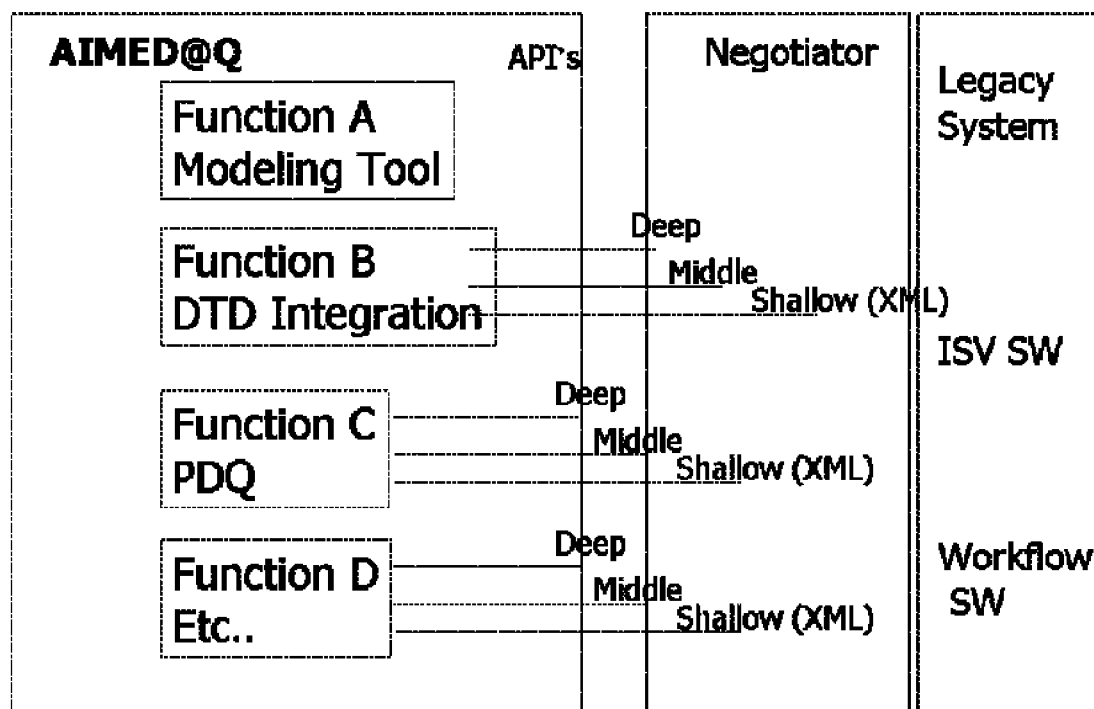

As shown in FIG. 2, Application Programming Interfaces (APIs) will be exposed for each Functional Element of the Services Software Module. The API's can be exposed at three levels for each Functional Element, deep, middle, and shallow. The middle API's will be a logical consolidation of the deep API's while the shallow API's will be a logical combination of the middle and deep. A custom negotiator can be written for the legacy system, current workflow, or software of an Independent Software Vendor (ISV) integration. For the initial functionality of AIMED@Q™, only one API level may need to be exposed due to the simple nature of this initial version of the software.

User interfaces, workflow, and security will be outside the scope of this software module, as they will be provided as functionality within the context of the larger document imaging or ECM system, with the exception of software protection for the purpose of tracking and collecting licensing fees.

| Definitions, Acronyms, and Abbreviations | |
|---|---|
| AIMED@Q ™ | This mark is used in connection with the Services Software Module; Automatic Integration and Management of Enterprise Data Quality |
| ECM | Enterprise Content Management |
| API | Application Programming Interface |
| ESB | Enterprise Service Bus |
| RBA | Rules Based Automation |
| Workflow Software | Either application specific workflow software such as a Filenet system or AnyDoc, or Customizable workflow software contained within the ESB. |
| ISV | Independent Software Vendor |
| XML | Extended Markup Language |
| SOA | Service Oriented Architecture |
| PDQ ™ | Production Data Quality monitoring. PDQ ™ enables cost-effective scoring on real production data, and comparison to benchmark data quality. |
| GUI | Graphical User Interface |
| Date Time Stamp | MM/DD/YYYY 00:00:00 format |
| Date Time Stamp Range | A range in MM/DD/YYYY 00:00:00-MM/DD/YYYY 00:00:00 format |
| OCR | Optical Character Recognition (This term often refers to recognition of machine print, but it is used herein to refer to recognition of handprint as well) |
| ICR | Intelligent Character Recognition (This is the newer term sometimes used for handprint recognition) |
| OMR | Optical Mark Recognition (This term refers to recognition of respondent's answers to multiple-choice questions) |
| Field | A string or one or more characters on a form, such as a last name. Check-box box questions are considered single fields. |
| DTD | Digital Test Deck ®; can be generic or based on the current system's forms. DTD enables controlled testing on simulated data always comparing to baseline and benchmark. |
| DTM | Digital Test Material (This term means the materials may be either paper or electronic files, as required) |
| DTT | Digital Test Truth. Text delimitated file with the correct answers for defined fields |
| DTAR0OCR | Digital Test Actual Results Immediately After OCR, with OCR reject rate (R) set at zero (0). Text delimitated file with defined fields |
| DTAOCR | Digital Test Actual Results Immediately After OCR. Text delimitated file with defined fields |
| DTACORR | Digital Test Actual Results Immediately After Correction Such as Key from Image. Text delimitated file with defined fields |
| B | Benchmark comparison at a specific date time, the percentage difference between Fields of the DTT and DTACORR. |

-continued

| Definitions, Acronyms, and Abbreviations | |
|---|---|
| $C_{sys}$: Data Capture System Cost per Year ($/year) | The total value of the equipment, facilities, software, and support labor to run the data capture system for a year. It is essentially a fixed cost, but may contain some amortized costs as appropriate. |
| V: Number of Forms Processed per Year (forms/year) | Average volume of forms processed per year. |
| F: Average Number of Fields per Form (fields/form) | The average number of non-blank write-in fields per form. |
| $C_k$: Cost to Key an Average Field ($/field) | The cost to key an average field. For example, if the fully-burdened keying labor rate is about $25/hour, the Keyers keyed at a rate of 5000 characters per hour, and the average field is six characters long, then this cost is: $C_k = (\$25/hr) \times (6\ char/field)/(5000\ char/hr) = \$0.03$ per field |
| R: Reject Rate $0 \leq R \leq 1$ | Reject Rate for OCR is the fraction of fields for which the OCR subsystem's confidence is less than a predetermined "confidence" threshold, so it does not "accept" the fields and send them on through to the database. The system designer and/or operator sets this confidence threshold, which in effect, determines the operational Reject Rate. Rejected fields are usually sent to human key entry operators. |
| $C_c$: Cost to Correct Results of an Incorrect Field ($/field) | The cost to the system operator's company if an incorrect field is propagated downstream into the company's business process. This cost is important to the Enterprise, and may be several thousand times larger than the cost to key an average field. |
| $E_0$: OCR Field Error at Zero Reject* | A technical parameter that may be measured with a Digital Test Deck ®: OCR Error Rate at zero reject. (See FIG. 4) |
| $R_b$: Base OCR Reject Rate* | This is the reject rate corresponding to the inflection in a linear OCR error model. (See FIG. 4) |
| $E_b$: Base OCR Error* | This is the OCR Error Rate at the base OCR Reject Rate. (See FIG. 4) |
| $E_k$: Error Rate for Field Keying* | Error in keying at the field level, $E_k$. |

*These numbers have no units, and are all numbers between zero and one, inclusive.

Operation on Desktop or in a Client Server Environment

The software may be run in a standalone mode as part of a desktop or distributed client service network as a shared application. In this mode (not integrated into the ESB or workflow software), selected input parameters must be input or selected that are not derived from systematic testing and will not represent actual system performance. Benchmark reports will not be able to be obtained.

A simple GUI helps the user select or input parameters, run the software and display outputs. This software can be both SOA and XML compliant.

Operation Integrated into Current Workflows and Content Management Systems

Ingest

A Digital Test Deck®, DTD, would be submitted for system ingest. The DTD would be tagged (DTD00000001) at submission. The flagging would occur immediately after scanning and conversion to a digital image or at the time of submission of the electronic DTD file.

The DTD would be processed utilizing current workflows. The resultant data file would be a Digital Test Actual OCR file (DTAR0OCR00000001) for data processed directly after OCR. Processing would be accomplished with the OCR Reject Rate Set at zero (0).

The DTD would be processed utilizing current workflows. The resultant data file would be a Digital Test Actual OCR file (DTAOCR00000001) for data processed directly after OCR. Processing would be accomplished with the normal OCR Reject Rate (R).

The DTD would be processed utilizing current workflows. The resultant data file would be a Digital Test Actual OCR file (DTACORR00000001) for data processed directly after any data correction. Processing would be accomplished with the normal OCR Reject Rate.

Tagged truth information would also be submitted into the ingest process, herein called Digital Test Truth (DTT00000001). This can be accomplished by bar coding of the DTD to facilitate content management workflow or workflow within the ESB. The Digital Test Truth would be converted to the Digital Test Actual file structure if not already so.

Content Management and Storage

Content management and storage would be handled as normal in the ECM system with the following exception: both for image and data test material files, all information would be tagged with the above test material schema including date and time stamps.

User Interface/Web Portal Services

User classes, including but not limited to Operations, Business Unit Management, Quality Assurance, and the Chief Information Office, would be able to access AIMED@Q™ Services through current system User Interface or Web Portal Services. Specific Test and Truth material image or data files would be accessed through the systems current content management systems.

Dissemination

The Enterprise Service Bus/Workflow Manager would allow AIMED@Q™ Services to also be pushed to the user community.

Security

Reseller Model (AIMED@Q is provided as a module that is integrated into other ISV software):

Open security, the ISV could be expected to protect the AIMED@Q™ software while tracking and paying licensing fees.

Negotiators could be SW protected for an annual licensing schema with the ability to allow 30 day trials.

AIMED@Q™ application software module could be SW protected for an annual licensing schema with the ability to allow 30-day trials.

Software Architecture

Figure 3:
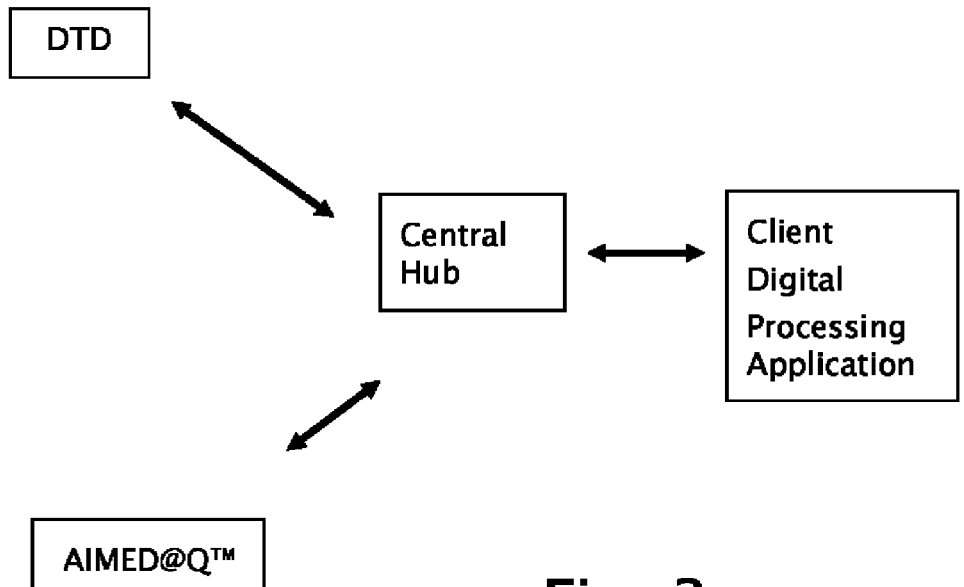
FIG. 3 shows a conceptual design of a web or browser based implementation.

FIG. 3 is a conceptual design of a web or browser based implementation. A central hub would manage traffic to and from the user classes. Test material would be ingested to the hub via inter or intra net secure connections. The client digital processing application would interface to the client systems, the DTD, and the AIMED@Q™ analysis tools via the central hub.

Input Parameters

Operation on Desktop or in a Client Server Environment and Operation Integrated into Current Workflows and Content Management Systems The user would set the following parameters in a desktop or client server environment. Users would be allowed to choose benchmark criteria or allowed to type in any numerical number in the correct format. Input will always be reference to the same date/time stamp range.

| Input Parameter | Math Notation & Units | Date/Time Range (all the same range) | Large System Example | Company A Example | ADI Lab System + A Example | User Selected Input |
|---|---|---|---|---|---|---|
| Data Capture System Cost per Year | $C_{sys}$ ($/year) | MM/DD/YYYY 00:00:00-MM/DD/YYYY 00:00:00 | $325M | $100M | $100M | $XM |
| Number of Forms Processed per Year | V (forms/year) | MM/DD/YYYY 00:00:00-MM/DD/YYYY 00:00:00 | 150M | 100M | 100M | $XM |
| Average Number of Fields per Form | F (fields/form) | MM/DD/YYYY 00:00:00-MM/DD/YYYY 00:00:00 | 21 | 21 | 21 | X |
| Cost to Key an Average Field | $C_k$ ($/field) | MM/DD/YYYY 00:00:00-MM/DD/YYYY 00:00:00 | $ 0.063 | $ 0.03 | $ 0.03 | $X |
| Cost to Correct Results of an Incorrect Field | $C_c$ ($/field) | MM/DD/YYYY 00:00:00-MM/DD/YYYY 00:00:00 | $ 1.58 | $ 0.30 | $ 0.30 | $X |
| OCR Field Error at Zero Reject | $E_0$ * | MM/DD/YYYY 00:00:00-MM/DD/YYYY 00:00:00 | 0.08 | 0.52 | 0.09 | X |
| Base OCR Reject Rate | $R_b$ * | MM/DD/YYYY 00:00:00-MM/DD/YYYY 00:00:00 | 0.16 | 0.75 | 0.22 | X |
| Base OCR Error | $E_b$ * | MM/DD/YYYY 00:00:00-MM/DD/YYYY 00:00:00 | 0.006 | 0.22 | 0.02 | X |

| Input Parameter | Math Notation & Units | Date/Time Range (all the same range) | Large System Example | Company A Example | ADI Lab System + A Example | User Selected Input |
|---|---|---|---|---|---|---|
| Error Rate for Field Keying | $E_k$ * | MM/DD/YYYY 00:00:00- MM/DD/YYYY 00:00:00 | 0.0235 | 0.04 | 0.04 | X |
| Reject Rate | R * | MM/DD/YYYY 00:00:00- MM/DD/YYYY 00:00:00 | 0 to 1.0 in 0.05 Increment | 0 to 1.0 in 0.05 Increment | 0 to 1.0 in 0.05 Increment | X |

* These numbers have no units, and are all numbers between zero and one, inclusive.

Operation Integrated into Current Workflows and Content Management Systems Only

The following inputs to our analysis are provided by the ESB or ISV workflow software. Input will always be reference to the same date/time stamp.

| Input Parameter | Date/Time Range (all the same range) | Math Notation & Units | System Input from Database |
|---|---|---|---|
| Digital Test Truth | MM/DD/YYYY 00:00:00-MM/DD/YYYY 00:00:00 | DTT00000001 | Text delimitated file with defined fields |
| Digital Test Actual Results Immediately After OCR, with Reject Rate set at Zero (0). | MM/DD/YYYY 00:00:00-MM/DD/YYYY 00:00:00 | DTAR0OCR00000001 | Text delimitated file with defined fields |
| Digital Test Actual Results Immediately After OCR | MM/DD/YYYY 00:00:00-MM/DD/YYYY 00:00:00 | DTAOCR00000001 | Text delimitated file with defined fields |
| Digital Test Actual Results Immediately After Correction Such as Key from Image or at any Other Point in the System Workflow | MM/DD/YYYY 00:00:00-MM/DD/YYYY 00:00:00 | DTACORR000000001 | Text delimitated file with defined fields |

With the above inputs, we can do all the analysis mentioned so far, and we can also do much more, and at steps in the workflow beyond the recognition and keying steps. The cost model can be modified so that the "cost of error" is increased at each subsequent step, simulating the error propagating downstream. With the timestamp, it also lends itself to workflow analysis in terms of efficiency. The timestamp with history enables Statistical Process Control. With this "nodal" concept, the workflow process steps themselves are a "black box", but each create a new "state" of the data that can be analyzed.

Software Algorithms Summary

Benchmark Comparison

At a specific data time range, the percentage difference is computed between Fields of the DTT and DTACORR.

X Fields of DTT are compared to the same X Fields of DTACORR. A hard match (all characters are the same, or both are recognized as ambiguous)=One (1). A non-match is if any characters or ambiguous answers are not the same=Zero (0).

$B$=(Hard Match Corrected SUM/$X$ Fields)*100% (for the noted time period)

Other criteria for correctness may also be used at the user's option, such as a type of "soft" match.

OCR Field Error at Zero Reject ($E_0$)

At a specific data time range, the percentage difference is computed between Fields of the DTT and DTAR0OCR.

X Fields of DTT are compared to the same X Fields of DTAR0OCR. A hard match (all characters are the same, or both are recognized as ambiguous)=One (1). A non-match is if any characters or ambiguous answers are not the same=Zero (0).

$E_0$=(Hard Match $R0$ SUM/$X$ Fields)(for the noted time period)

A Simple Model for OCR Error as a Function of Reject Rate ($E_{ocr}(R)$)

Based on looking at thousands of real data points of OCR error as a function of reject rate, we sometimes find it handy to use a simple model of a straight line starting at $E_{ocr}(0)=E_0$, sloping down to a floor of $E_{ocr}(R_b)=E_b$. The specific model for OCR error is:

$$E_{ocr}(R)=(E_0-E_b)(1-R/R_b)+E_b, \text{ if } 0\leq R\leq R_b, \text{ and }=E_b, \text{ if } R_b<R\leq 1$$

Figure 4:
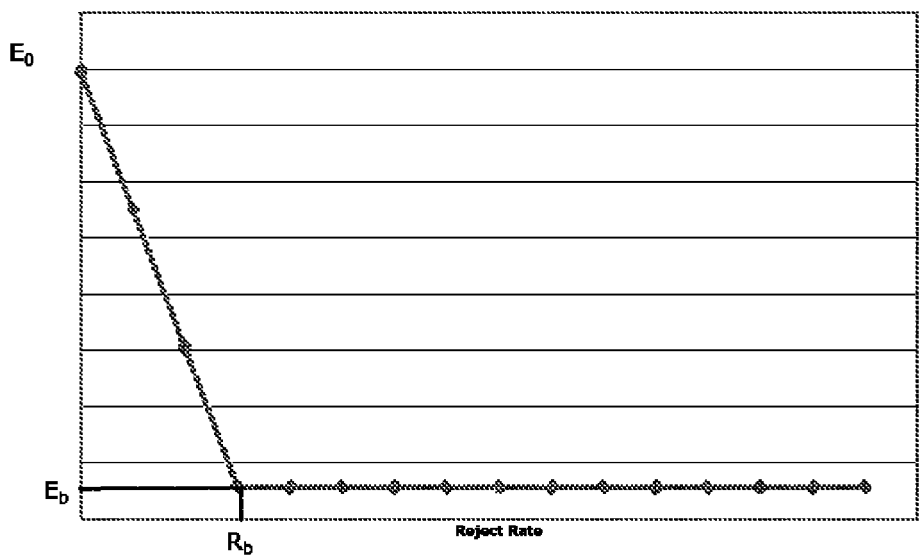
FIG. 4 is a graph of a simple linear model for OCR error rate as a function of reject rate.

When you plot it, it looks like FIG. 4.

In some cases, a detailed set of data points describing error rate versus reject rate may not be readily available, so this simple linear model shown above is useful if you know the error rate at zero reject and the approximate break points. If the detailed data is available from measurements using this invention, then the entire data set may be used in these calculations.

Model for Total Cost per Year for Data Capture ($C_{tot}$)

In order to get a relationship for total cost $C_{tot}$, we add up the elements of cost. The first term is the (fixed) system cost $C_{sys}$. Then, in brackets multiplied by the total number of fields processed VF, we have the cost of keying the rejects, plus the cost of an error committed by the OCR, plus the cost of an error produced by keying.

Our model for total cost (per year, typically), for data capture is:

$$C_{tot} = C_{sys} + VF[C_k R + C_e E_{ocr}(R)(1-R) + C_e E_k R]$$

If desired, one may output Cost per form=$C_{tot}/V$ dollars per form.

Illustrative Outputs

Cost Per Form, OCR Error Rate and Error in Keying at Field Level Versus Reject Rate Data File

| Data Time Stamp (All at the same Date Time Stamp) | Reject Rate | Cost Per Form | OCR Error Rate | Error in Keying |
|---|---|---|---|---|
| MM/DD/YYYY 00:00:00-MM/DD/YYYY 00:00:00 | 0.00 | $C_{tot}/V$ | $E_b$ | $E_k$ |
| MM/DD/YYYY 00:00:00-MM/DD/YYYY 00:00:00 | 0.05 | $C_{tot}/V$ | $E_b$ | $E_k$ |
| MM/DD/YYYY 00:00:00-MM/DD/YYYY 00:00:00 | 0.10 ... 0.90 in 0.05 increments | $C_{tot}/V$ | $E_b$ | $E_k$ |
| MM/DD/YYYY 00:00:00-MM/DD/YYYY 00:00:00 | 0.95 | $C_{tot}/V$ | $E_b$ | $E_k$ |
| MM/DD/YYYY 00:00:00-MM/DD/YYYY 00:00:00 | 1.00 | $C_{tot}/V$ | $E_b$ | $E_k$ |

| I/O | | | |
|---|---|---|---|
| DTD Field Data Tag | Date and Time Stamp | Reco (OCR) Answer | TRUTH |
| DTD Field Data Tag | Date and Time Stamp | Keying (Correction) Answer | TRUTH |
| For every Field ... | | | |

| Calculations/Algorithms | | | |
|---|---|---|---|
| DTD Field Data Tag range (for entire DTD) | Recognition Reject Rates from 0% to 100% at increments of 1% | Corresponding Error Rates at each Reject Rate | Keying Error Rate for Rejected Fields in DTD |

From the above data, an OCR Error Rate vs. Reject Rate curve can be generated, thus enabling the $/Form vs. Reject curve to be also generated, as a robust guide to improvement progress.

Benchmark Comparison (Integrated into the System with DTD Technology)

| Data Time Stamp | B |
|---|---|
| MM/DD/YYYY 00:00:00-MM/DD/YYYY 00:00:00 | X % |

The invention can also be arranged to allow auditing for effective management of outsourced data entry and forms processing services for both cost and quality of data. A DTD or other suitable test materials are injected into the services providers' current workflow and benchmarked for cost per page and error rates coming into the client systems enabling Service Level Agreement enforcement for both cost and data quality. Benefits include:

Reduce your cost of your outsourced forms processing
Reduce system error rates
Implement corrective action with services providers outside agreed tolerances to include contract enforcement and monitoring
Reduce purchasing costs through supplier certification and monitoring programs
Improve data quality by implementing SLA agreements to include data error rates for all of your services providers
Reduced business risk due to data error
Regulatory compliance
Increase in customer's satisfaction The invention can also be arranged to technically differentiate alternative bidders for competitive request for proposals. A DTD that is a simulation of the user's current form type(s) with realistic respondent data is supplied to bidders. Bidders provide results from their proposed solution recognition engine or from data entry (for outsourced solutions). Bidders may then be scored and ranked for the best technical solution. Benefits include:

Ability to elect the best solution for your imaging system with the lowest possible cost per page and data error rates
It is a fair test, as each bidder has identically the same test deck
Reduce or eliminate bid protests Another variation on this invention is to use a business rules-based engine that sits off the ESB or workflow software layer internal to the ECM system, which typically stores, or has the ability to create encapsulated information files. These files are utilized for various downstream workflow processes. This invention is to seed the ECM system with data files that would have a predetermined answer based on the requirements of the downstream workflow processes. At a statistically valid cadence, flagged test paper or electronic content would be ingested into the workflow to reside in the depository. Automatic electronic auditing would be performed at many or all of the user group access points and compared to our previously known truth for validity. The statistics and content of the rules engine would be varied depending on current or assumed error rates, necessary time frames to catch workflow errors, desired confidence levels, and other customer-defined requirements. Part of the value here is that content in an ECM system is typically changed and repurposed; physical storage layers are modified, storage software, workflow and content ownership, encryption security layers and so on all change over time and result in changes to content. This auditing and data quality management system would be focused on information after the conversion process but internal to the ECM system. An advantage of this type of software system is that it can run in the background with no manual intervention, providing reports, trends, and other information automatically, and would only need to be refreshed periodically as new content types are ingested into the ECM system.

An example would be the e-Discovery process for legal applications. Typically e-mails are the first set of information sets to be collected, as they are organized and managed and therefore can be discovered. For a Lotus Notes application, a Zantac e-mail server and software application serves this purpose. Encapsulated files pulled from the Zantac system are denoted as ".nsf" files. Encapsulated ".nsf" files would be created as DTD Data Files and placed on the Zantac server. The files would be created in such as way as to statistically test the 60 some odd requirements of the discovery process for e-Discovery of the Zantac system. These requirements include things such as removing e-mails that are privileged (husband and wife, or attorney communications), correctly organizing the information, and correctly identifying "hot docs" with certain predefined key words contained within the e-mails or attachments. When litigation is instigated, the DTD data files would be included in the discovery process. During the final quality checks before the ".nsf" files are produced, the files would be compared to the known predetermined answers, and removed from the submitted discovery package. Risk would be significantly decreased, as you now have an audited process and understand if you are not producing information you are legally required to produce, and/or are producing information you should not, either of which could cause you to lose the case.

Simulated Data to Check Process Rule Performance

Much of the above description deals with measuring data accuracy, such as to what extent does a data capture system correctly recognize a hand printed character string? It is an additional benefit of this invention that the simulated data may also be created in such a way as to test the system's internal logic and/or the ability of humans associated with the process to follow the necessary business rules. Some examples of how this is done are instructive.

For example, in the case of a census survey, the respondent might be expected to write the number of people in a household in a two-digit numerical field called, say, "pop", and then write data about each person in the household in a section of the census form called, say, a "person block". Normally, then, you would expect that the number in the "pop" field would be the same as the number of person blocks that contained data. However, it often happens that the "pop" field says, for example, "05", but there are, say, six person blocks actually containing data. In this case, this form image is supposed to be automatically presented on a computer screen to a human analyst, who attempts to resolve the possible discrepancy. If we wish to test the extent to which the data processing system is correctly presenting form images to the analysts, we would intentionally put "05" in the "pop" field on a simulated form but with six person blocks filled out with data. In a very large test set with thousands of simulated household forms, we could place, say, 100 forms in the test deck that intentionally have this discrepancy, and test to see if all 100 get to the analysts, or if only 90 forms do, (or even if 110 forms are presented). This sort of test would be looking for issues with the inherent system logical performance.

There are also people involved in capturing census data, and in addition to keying the handprint fields accurately, they are expected to follow certain "keying rules". Our simulated data sets may also test to see if the keyers, either individually, or as groups, are following these rules. For example, keyers may be told that if they see someone print "FIVE" in the "pop" field (where numbers are expected, not letters), then they are supposed to key the digits "05", assuming the intent of the respondent was clear. We can test for the extent to which keyers follow this rule by intentionally placing the character string "FIVE" in a "pop" numeric field, and seeing if the resultant output ASCII data string contains a "05", as it should if the keying rule was followed correctly.

Although the above description is given with respect to preferred embodiments, one skilled in the art of forms processing data capture will employ various modifications and generalizations to meet specific system needs. For example, although basic forms are discussed above, this invention clearly applies to other types of documents, such as bank checks, shipping labels, health claim forms, beneficiary forms, invoices, and other varieties of printed forms. The type of data being captured, in addition to handprint, could also be machine print, cursive writing, marks in check boxes, filled-in ovals, MICR font characters, barcodes, etc. The special test materials might include printed test decks, or in some cases, when testing only a sub-system of the overall forms processing system such as keying, just the electronic "snippets" or images of these forms may suffice. The special test materials for which the truth is perfectly known by design may be used, and/or it is possible to determine the truth of a collection of real production data if that is desired.

The invention claimed is:

1. A method of evaluating a data capturing system of a forms processing system including at least one of an optical character recognition system engine and a Key From Image system where image snippets appear to Keyers on computer screens comprising steps of incorporating simulated forms data as images image snippets of predetermined contents into a workflow of the data capture system; the simulated forms data image snippets being computer generated from the predetermined contents, supplying truth data corresponding to the predetermined contents of the simulated forms data image snippets to an electronic scoring module in an electronic digital form, interpreting the simulated forms data image snippets within the workflow of the data capture system for inferring contents of the images simulated forms data image snippets through the at least one of the optical character recognition system engine and the Key From Image system where the image snippets appear to Keyers on the computer screens, sending the inferred contents of the forms data image snippets from the data capture system to the electronic scoring module in an electronic digital form, selecting benchmark comparison criteria through a graphical user interface in communication with the electronic scoring module, comparing the inferred contents of the simulated forms data image snippets to the truth data corresponding to their predetermined contents within the electronic scoring module, and scoring results of the comparison in accordance with the benchmark comparison criteria within the electronic scoring module for evaluating the data capture system, wherein the simulated forms data subject to interpreting provide statistically significant results.

2. The method of claim 1 in which the step of incorporating includes inputting the image snippets of the simulated forms data along with digital code corresponding to the predetermined contents of the simulated forms data image snippets.

3. The method of claim 1 including steps of accepting the inferred contents that meet a confidence criterion and not accepting the inferred contents that do not meet the confidence criterion, and wherein the step of comparing includes comparing at least one of the inferred contents that meet the confidence criterion and the inferred contents that do not meet the confidence criterion to the predetermined contents.

4. The method of claim 3 in which the step of comparing includes comparing both the inferred contents that meet the confidence criterion and the inferred contents that do not meet the confidence criterion to the predetermined contents.

5. The method of claim 3 including steps of further interpreting certain of the image snippets of the forms data for further inferring the contents of the image snippets associated with the not accepted contents.

6. The method of claim 5 in which the step of comparing includes comparing the further inferred contents with the predetermined contents.

7. The method of claim 6 in which the step of scoring includes scoring results of the comparison between the further inferred contents and the predetermined contents for evaluating the data capture system.

8. The method of claim 6 in which the step of interpreting includes machine interpreting and the step of further interpreting includes human interpreting.

9. The method of claim 8 in which the step of interpreting includes machine interpreting and the step of further interpreting includes machine interpreting.

10. The method of claim 1 in which the step of incorporating simulated forms data is conducted in conjunction with incorporating actual forms data, and including a step of flagging the image snippets of the simulated forms data for distinguishing the simulated forms data from the actual forms data.

11. The method of claim 1 including a further step of associating date and time stamps with the image snippets of the simulated forms data.

12. The method of claim 11 in which the step of scoring includes relating the comparisons to prescribed date and time intervals.

13. The method of claim 12 including a step of evaluating changes in data capturing performance over time.

14. The method of claim 1 including associating costs with mismatches between the inferred contents and the predetermined contents for evaluating the costs of errors in the data capturing system.

15. A method of comparing first and second data capture systems each including at least one of an optical character recognition system engine and a Key From Image system where image snippets appear to Keyers on computer screens comprising steps of incorporating corresponding sets of simulated forms data as image snippets representing known contents into workflows of the first and second data capture systems, supplying truth data corresponding to the known contents of the simulated forms data image snippets to an electronic scoring module in an electronic digital form, interpreting the simulated forms data image snippets within the workflow of the first data capture system for inferring contents of the simulated forms data image snippets through the at least one of the optical character recognition system engine and the Key From Image system where the image snippets appear to Keyers on the computer screens, sending the inferred contents of the simulated forms data image snippets from the first data capture system to the electronic scoring module in an electronic digital form, interpreting the simulated forms data image snippets within the workflow of the second data capture system for inferring contents of the simulated forms data image snippets through the at least one of the optical character recognition system engine and the Key From Image system where the image snippets appear to Keyers on the computer screens, sending the inferred contents of the simulated forms data image snippets from the second data capture system to the electronic scoring module in an electronic digital form, comparing the inferred contents of the simulated forms data image snippets from the workflows of the first and second data capture systems to the truth data corresponding to their known contents within the electronic scoring module, and scoring results of the comparisons for evaluating the different first and second data capture systems with respect to each other.

16. The method of claim 15 in which one of the different data capture systems is a modified form of another of the different data capture systems and the step of scoring includes scoring the results for evaluating the modification.

17. The method of claim 16 including a step of associating date and time stamps with the image snippets of the simulated forms data incorporated into the different data capture systems.

18. The method of claim 17 in which the step of scoring includes separately scoring the results within different date and time periods associated with performances of the different data capture systems.

19. The method of claim 15 in which the different data capture systems include at least two data capture systems that are operated in parallel.

20. The method of claim 19 in which the step of scoring includes scoring the results of the at least two data capture systems using similar benchmark criteria.

* * * * *